United States Patent Office 3,595,609
Patented July 27, 1971

3,595,609
CYCLIC PROCESS FOR PRODUCING POTASSIUM NITRATE AND AMMONIUM CHLORIDE
Leland J. Beckham, Lutz, Fla., assignor to Allied Chemical Corporation, New York, N.Y.
Filed Oct. 13, 1969, Ser. No. 865,808
Int. Cl. C01c 1/16; C01d 9/10, 9/16
U.S. Cl. 23—100
10 Claims

ABSTRACT OF THE DISCLOSURE

Potassium chloride and water are added to a first aqueous nitrate-chloride mother liquor having a $$K^+/(K^++NH_4^+)$$

mol ratio of not more than about 0.37 to form a potassium nitrate crystallization medium. The medium is cooled to precipitate crystalline potassium nitrate and form a second nitrate-chloride mother liquor. After separation of the potassium nitrate, ammonium nitrate is added to the second mother liquor, all added water is evaporated to form an ammonium chloride crystallization medium, and ammonium chloride is crystallized at a temperature higher than the potassium nitrate crystallization. The ammonium chloride is separated, and the residual mother liquor is recycled to receive additional potassium chloride and water. The maintenance of a net balance of components permits continuous operation of a cyclic metathesis operation.

BACKGROUND OF THE INVENTION

This invention relates to production of potassium nitrate fertilizers that are low in chloride content, and in particular to a cyclic process for the production of crystalline potassium nitrate low in chloride, with by-product formation of crystalline ammonium chloride. As is known, ammonium chloride is also suitable as a fertilizer for certain crops, for example, rice, which is tolerant to chloride.

Potassium nitrate has obvious crop producing values as a fertilizer because of its high analysis, greater plant response, and almost complete absence of sodium, chloride or other substances which can be deleterious to crops. To better identify the agronomic advantages of potassium nitrate, extensive agronomic tests have been conducted in the United States, Australia, Korea, Japan, and other countries on many crops. Moreover, the detrimental effect of chloride buildup in the soil from long-term use of potassium chloride is well documented and is a present danger in such areas.

It is apparent from these facts that potassium nitrate is a valuable fertilizer; however, heretofore a low-cost process for producing potassium nitrate has not been available.

It is well known to conduct a metathesis between two salts in the presence of water to form the solid stable salt pair. Thus, one can dissolve equivalent amounts of the two salts and then alternately separate first one and then the other of the solid products by crystallization at two different temperatures at two different solids concentrations. In particular, it is known that one can add an equivalent mixture of solid ammonium nitrate and solid potassium chloride to water and crystallize out potassium nitrate at the lower of two temperatures, e.g., 0° C., then remove some of the water and crystallize out the ammonium chloride at a higher temperature, e.g., 25° C., then add back the water with makeup quantities of the reactants to continue the cycle indefinitely. Unfortunately, the phase relationships for the salt pair-water system are such that this known process must be operated in a very restricted region to maintain product purity. Consequently, the procedure is not sufficiently flexible for the selection of economic operating conditions.

It is also known to initiate the above-described cyclic process by starting the first cycle with a nonequivalent mixture of reactants. This modification has certain advantages and somewhat increases the range of operating conditions that can be selected. Another procedure has been suggested wherein part of the potassium chloride is added separately from the ammonium nitrate to vary the operation of the process in the direction of increased flexibility of operation. However, none of the known procedures has been sufficiently flexible to permit design of an economic process. Further, potassium nitrate is synthesized in this country by a process involving reaction of potassium chloride with nitric acid, which process is highly corrosive.

SUMMARY OF THE INVENTION

It has been found that crystalline potassium nitrate and crystalline ammonium chloride can be produced by a cyclic process involving the steps:

(a) adding potassium chloride and water to a first aqueous nitrate-chloride mother liquor having a $$K^+/(K^++NH_4^+)$$

mol ratio of not more than about 0.37, the potassium chloride and water being added to the first aqueous nitrate-chloride mother liquor in amount sufficient to convert the mother liquor into a potassium nitrate crystallizing medium;

(b) cooling the potassium nitrate crystallizing medium sufficiently to crystallize potassium nitrate equivalent to the potassium chloride added in step (a) and provide a second aqueous nitrate-chloride mother liquor having approximately the same $K^+/(K^++NH_4^+)$ mol ratio as the first nitrate-chloride mother liquor and a higher $$Cl^-/(NO_3^-+Cl^-)$$

mol ratio than the first nitrate-chloride mother liquor;

(c) separating crystalline potassium nitrate from the second aqueous nitrate-chloride mother liquor;

(d) adding ammonium nitrate to the second aqueous nitrate-chloride mother liquor in amount equivalent to the amount of potassium nitrate separated in step (c);

(e) evaporating water from the mixture of ammonium nitrate and second aqueous nitrate-chloride mother liquor to produce an ammonium chloride crystallizing medium, the amount of water evaporated being equal to the amount of water added in step (a);

(f) crystallizing ammonium chloride from the ammonium chloride crystallizing medium at a temperature substantially higher than the crystallization temperature of potassium nitrate in step (b), to provide a mother liquor substantially the same as the first aqueous nitrate-chloride mother liquor fed to step (a);

(g) separating crystalline ammonium chloride from the mother liquor; and then (h) repeating the steps (a)–(g) on the mother liquor recovered in step (g).

BRIEF DESCRIPTION OF THE DRAWINGS

For a better understanding of the instant invention, reference is made to the accompanying drawings, wherein.

in terms of mol percent at two temperatures, 60° C. and 0° C. The Jänecke-type phase diagram permits water to be eliminated from the diagram by the device of assuming that a shadow is cast from a point of light situated at the apex of the pyramid. The regions of the diagram represent solutions saturated with respect to $Na_4NO_3$, $KNO_3$, $NH_4Cl$, and $KCl$. The numerals shown at representative points on the diagram give concentration in terms of mols of water per 100 mols of dissolved salts. Operating lines for a process illustrating the instant invention are superimposed on the phase diagram as dotted lines.

DETAILED DESCRIPTION OF THE INVENTION

This invention involves a two-stage cyclic process for the production of potassium nitrate and ammonium chloride by reaction of potassium chloride and ammonium nitrate. The first stage is a crystallization process wherein is produced crystalline potassium nitrate in accordance with the equation:

(1)      $KCl + NH_4NO_3 \longrightarrow KNO_3 + NH_4Cl$
         (solid)   (aqueous)      (solid)   (aqueous)

The second state is a crystallization process wherein crystalline ammonium chloride is produced in accordance with the equation:

(2)      $NH_4NO_3 + KCl \longrightarrow NH_4Cl + KNO_3$
         (solid)   (aqueous)      (solid)   (aqueous)

The aqueous ammonium nitrate fed to stage (1) and the aqueous potassium chloride fed to stage (2) are contained in mother liquors recycled from one stage to the other.

The overall process is operable from $-16°$ C. to the boiling point of the mixture; however, because of phase relationships in the system $$H_2O\text{---}NH_4NO_3\text{---}KNO_3\text{---}NH_4Cl\text{---}KCl$$

the crystallization of potassium nitrate is carried out at a lower temperature and a lower solids concentration than the crystallization of ammonium chloride. The closer the crystallization temperatures are together, other factors being equal, the less water that must be evaporated during the processing but the more recycle solution which must be handled.

The instant process is very flexible in permitting selection of economic conditions for conducting the metathesis. For example, if desired, the process can be operated at temperatures that permit low-cost cooling with river water, with total elimination of refrigeration equipment. Optimum conditions may be selected based on engineering studies of cost factors which will vary in accordance with the location and size of the plant and other factors; however, the process is so flexible that conditions are readily varied over a wide range.

Figure 1:
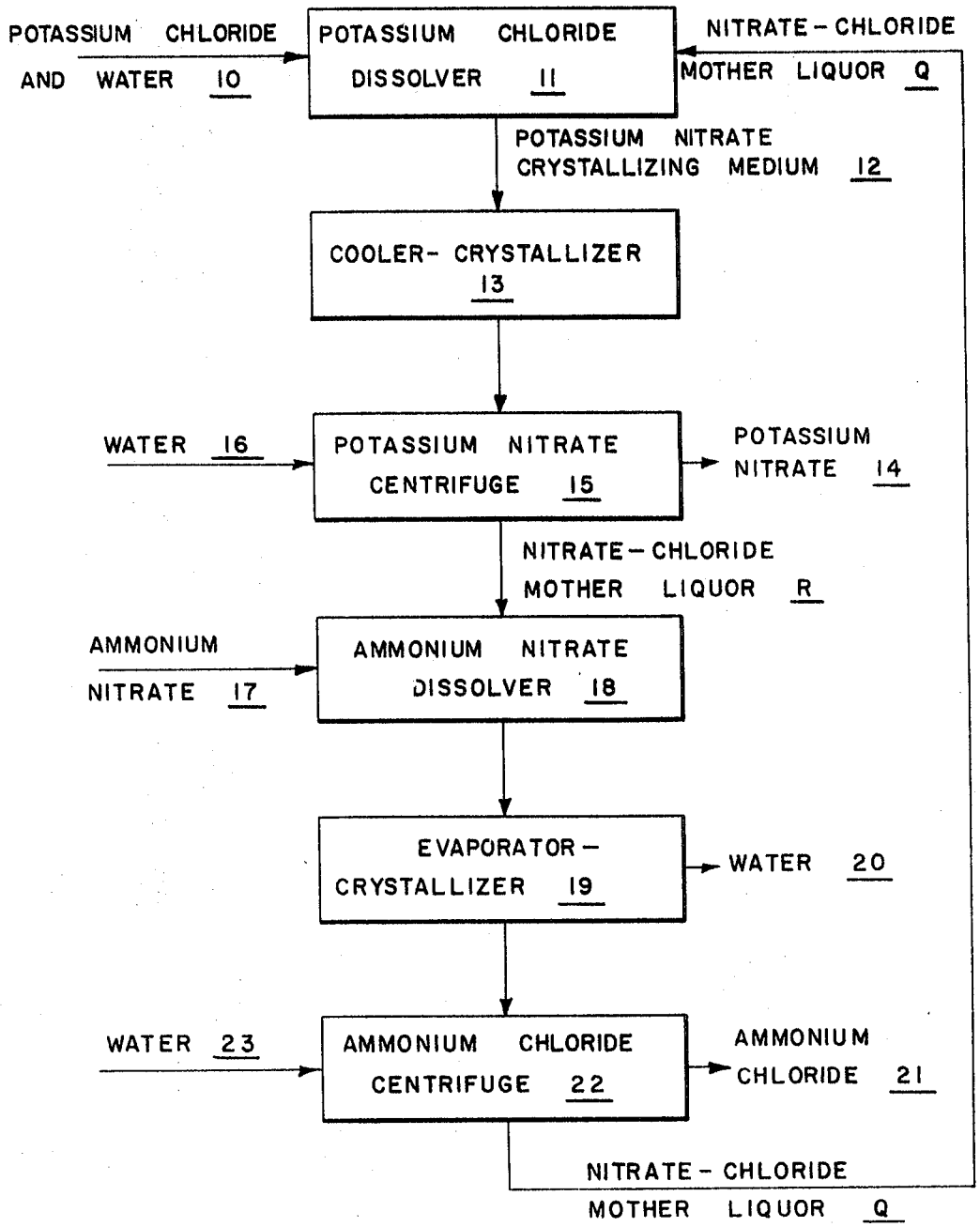
FIG. 1 is a flow diagram of the process.

Referring to FIG. 1, the instant process involves adding potassium chloride and water 10 to nitrate-chloride mother liquor Q in potassium chloride dissolver 11 wherein the potassium chloride is dissolved. The resulting potassium nitrate crystallizing medium 12 is sent to cooler-crystallizer 13 wherein potassium nitrate is crystallized and a second nitrate-chloride mother liquor R is formed. The nitrate-chloride mother liquor R is then passed to potassium nitrate centrifuge 15 wherein the crystalline potassium nitrate 14 is separated from the nitrate-chloride mother liquor. Residual mother liquor may be washed from the potassium nitrate crystals in the centrifuge with water 16.

Ammonium nitrate 17 is mixed with nitrate-chloride mother liquor R in ammonium nitrate dissolver 18 and the mixture is sent to evaporator-crystallizer 19 wherein part of the water 20 is evaporated to form an ammonium chloride crystallizing medium from which ammonium chloride is crystallized. The crystalline ammonium chloride 21 is separated from its nitrate-chloride mother liquor Q in ammonium chloride centrifuge 22. Residual mother liquor may be washed from the ammonium chloride crystals in the centrifuge with water 23. The nitrate-chloride mother liquor Q is recycled to potassium chloride dissolver 11. In crystallizing the ammonium chloride, the evaporation of water from the reaction mixture to form an ammonium chloride crystallizing medium and the ammonium chloride crystallization are normally carried out simultaneously at reduced pressure; however, it is possible to carry out the evaporation and crystallization as separate operations.

The unexpected ability to operate the instant process over a wide range of temperature conditions is dependent upon the "split-feed" of reactants, i.e., operation of the overall metathesis as a two-stage process with feed of potassium chloride to one stage and feed of ammonium nitrate to another stage. Other factors are also important and are discussed with reference to FIG. 2.

Figure 2:
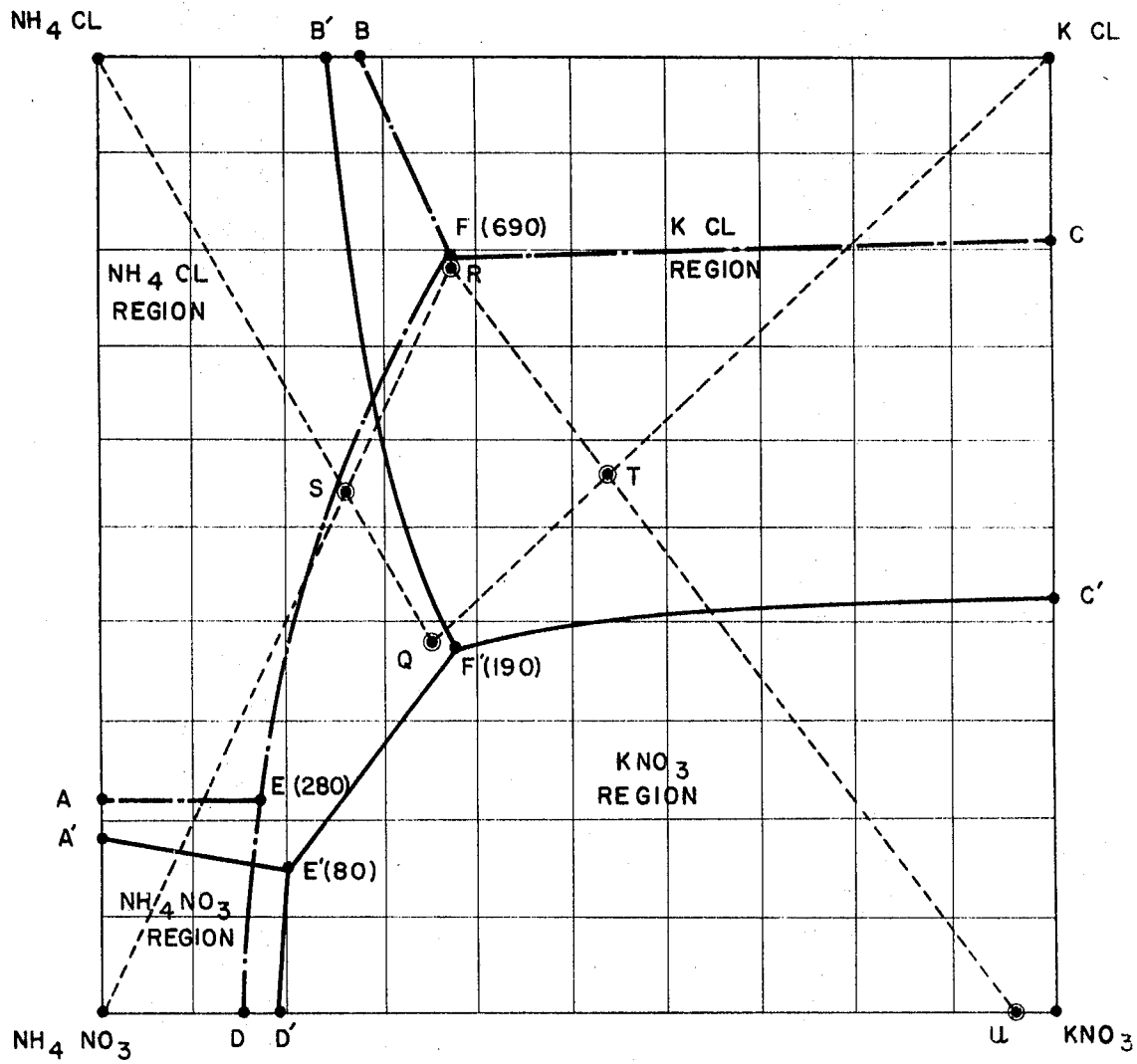
FIG. 2 is a schematic Jänecke-type phase diagram of the reciprocal-pair, 4-component, water-containing system $$H_2O—NH_4NO_3—KNO_3—NH_4Cl—KCl$$

The effect of $K^+/(K^++NH_4^+)$ mol ratio of the nitrate-chloride mother liquors on solubility is illustrated in FIG. 2 which depicts a phase diagram for the instant system over the temperature range 0–60° C. A point on the phase diagram represents the $NH_4^+/K^+$ and $Cl^-/NO_3^-$ mol ratios of the composition in question. FIG. 2 is intended to be an illustrative representation of the instant system, with the location of points and lines therein being approximate and not intended to provide a quantitative measure of relative concentrations. Solid lines represent the phase boundaries at the two temperatures, 0° C. and 60° C. The area enclosed by points DEFC represents those compositions from which potassium nitrate will crystallize at 0° C.; the area enclosed by points BFC represents those compositions from which potassium chloride will crystallize, the area enclosed by points BFEA represents those compositions from which ammonium chloride will crystallize; and the area enclosed by points AED represents those compositions from which ammonium nitrate will crystallize. The bracketed numerals shown at triple points F and E give concentration in terms of mols of water per 100 mols of dissolved salts. Solutions having the compositions F and E will be in equilibrium with three solid phases as indicated in the diagram. With rising temperature, point E is displaced downward and to the right to higher $K^+/NH_4^+$ and higher $NO_3^-/Cl^-$ mol ratios, and equilibrium water concentrations decrease. Point F is displaced primarily downward and at temperatures above 60° somewhat to the left.

As the temperature is increased, the entire phase boundary system DEFC shifts. Thus, as temperature is increased from 0° C. to 60° C., the phase boundaries shift from DEFC to D'E'F'C', indicating with respect to the instant invention a relative increase in the solubility of potassium nitrate with respect to ammonium chloride. Thus, the potassium nitrate is crystallized in the instant process at the lower of two temperatures and the ammonium chloride is crystallized at the higher of two temperatures. Desirably at least 20° C. is allowed between the two crystallization temperatures.

FIG. 2 shows the various steps in the crystallization cycle of the instant process. Inasmuch as this is a cyclic process, it can be discussed starting at any point in the cycle; point R is selected as a matter of convenience. Point R represents the potassium nitrate mother liquor, a composition that is critical to successful operation of the process. After crystallization of the potassium nitrate, the composition of the mother liquor represented by point R should be as close to the phase boundary as practical, preferably along the phase boundary represented by the line EF, and more preferably close to point F. Due to formation of solid solutions in the potassium nitrate crystallization area, the crystallizing potassium nitrate will contain some ammonium nitrate, however, much purer potassium nitrate will crystallize when point R is closer to F than to E.

Although point R must be within the potassium nitrate crystallization area, the $NH_4^+/K^+$ ratio of this mother liquor should be rather close to the value represented by the EF boundary. Desirably, the process is operated so that when the temperature is raised for the ensuing steps, the $NH_4^+/K^+$ mol ratio of mother liquor R will lie to the left of E'F', as discussed hereinafter. For normal operation of the process, the $K^+/(K^++NH_4^+)$ mol ratio of point R is not greater than 0.37, preferably in the range 0.20–0.37.

The $Cl^-/NO_3^-$ mol ratio of the potassium nitrate mother liquor represented by point R must fall within a range determined by the overall process. As stated previously, R is preferably located in the potassium nitrate crystallization area along the phase boundary represented by the line EF, and more preferably close to point F. Thus, the $Cl^-/NO_3^-$ mol ratio for R will vary greatly for operations at temperatures from say 0° to 100° C. Normally, the $Cl^-/(NO_3^-+Cl^-)$ mol ratio of R will be greater than 0.20, preferably about 0.40–0.80. For example, at 0° C., the optimum $Cl^-/(NO_3^-+Cl^-)$ mol ratio of R is about 0.78.

The potassium nitrate mother liquor R is obtained by crystallizing potassium nitrate from potassium nitrate crystallizing medium T, described in detail hereinafter, and then separating the solid potassium nitrate therefrom. The amount of potassium nitrate which is crystallized and separated is that amount which is sufficient to provide a mother liquor of the desired composition, i.e., sufficient to provide the desired $K^+/(K^++NH_4^+)$ mol ratio. A crystallization temperature is selected corresponding to the desired amount of potassium nitrate crystallization and the particular water level being employed. Preferably, the temperature for crystallizing and separating the potassium nitrate will be in the range of about 0–60° C., more preferably about 0–40° C.

After separation of the solid potassium nitrate, the composition of the remaining mother liquor R is adjusted to provide an ammonium chloride crystallizing medium of composition S. This adjustment is accomplished, in part, by adding ammonium nitrate to the mother liquor R in an amount sufficient to replenish the amount of nitrate ion lost by separation of potassium nitrate. Upon adding ammonium nitrate to mother liquor R, a mixture of composition S is obtained. Inasmuch as the chloride content of the system is not altered by separating crystalline potassium nitrate and adding equivalent ammonium nitrate, the $Cl^-/NO_3^-$ mol ratios of S and T are equal; i.e., the $Cl^-/NO_3^-$ mol ratio at S is restored to the same value as T. Of course, when excess ammonium nitrate is used to provide the ammonium nitrate impurity in the product potassium nitrate, the $Cl^-/NO_3^-$ ratios of S and T will not be exactly equal.

In addition to adding ammonium nitrate to the mother liquor R, some water is removed to provide the ammonium chloride crystallizing medium. That is, water is removed to permit crystallization of ammonium chloride at a higher temperature at which the crystallization is outside the potassium nitrate field. Normally, this adjustment requires removal of a quantity of water equal to that quantity which was added to the system during the previous cycle. Upon adjusting the water content of crystallizing medium S, a suitable temperature can be employed for crystallizing and separating the ammonium chloride which will result in the desired amount of crystallization at that water content. Preferably, water removal and crystallization are carried out simultaneously at a selected temperature. Ammonium chloride is normally crystallized and separated equivalent to the potassium chloride added to the system during the previous cycle, thereby producing ammonium chloride mother liquor Q.

The composition of mother liquor Q is then adjusted by addition of potassium chloride and water to provide potassium nitrate crystallizing medium T. Sufficient potassium chloride is dissolved to change the salt composition from the composition of Q to the composition of T. As previously stated, the potassium chloride added is normally equivalent to the ammonium chloride removed during the ammonium chloride separation step of the process. Also, sufficient water is added to permit going to a lower crystallization temperature while remaining in the potassium nitrate field. As previously stated, water added is normally equivalent to the water removed from the system during the evaporation step of the process.

It is significant that the point T is on the line RU. U is the composition of the potassium nitrate precipitate that is crystallized from the potassium nitrate crystallization medium when the mother liquor has the composition R. The composition of U will vary somewhat depending upon the crystallization temperature and position of point R. As previously stated, R is preferably near point F.

The potassium nitrate mother liquor R is then obtained by crystallizing potassium nitrate from the potassium nitrate crystallizing medium T by cooling to the desired temperature, as previously described, and the cyclic process is repeated.

The following examples are provided to more fully illustrate the instant invention. They are provided for illustrative purposes only and are not to be construed as limiting the scope of the invention, which is defined by the appended claims.

EXAMPLE I

A nitrate-chloride mother liquor having the following analysis:

|  | Grams |
|---|---|
| Ammonium chloride | 10,650 |
| Ammonium nitrate | 10,900 |
| Potassium nitrate | 19,050 |
| Water | 18,867 | and having a $K^+/(K^++NH_4^+)$ mol ratio of 0.36 and a $Cl^-/(C^-+NO_3^-)$ mol ratio of 0.38, was sent to a potassium chloride dissolver operated at 60° C. To this solution was added 4,685 grams of potassium chloride and 9,433 grams of water, the potassium chloride being dissolved with adequate mixing. The solution was cooled to 40° C. in a cooler-crystallizer to crystallize potassium nitrate. The resulting slurry was centrifuged at 40° C. to separate a solid containing 6,350 grams of potassium nitrate and 504 grams of ammonium nitrate impurity. The solid was washed with 300 grams of water and washings were added to the mother liquor. Purity of the crystalline potassium nitrate was 93 weight percent. The resulting nitrate-chloride mother liquor had a $K^+/K^++NH_4^+)$ mol ratio of 0.365.

The mother liquor from the potassium nitrate centrifuge was pumped to an ammonium nitrate dissolver operated at 60° C., and 5,530 grams of ammonium nitrate was added and dissolved. The resulting solution was sent to an evaporator-crystallizer operated at about 60° C. at about 150 mm. Hg to remove 9,433 grams of water and crystallize ammonium chloride. The resulting slurry was centrifuged at 60° C. to separate 3,361 grams of ammonium chloride. The crystalline ammonium chloride was washed with 180 grams of water and washings were added to the mother liquor.

The mother liquor separated from the ammonium chloride centrifuge was substantially identical in composition with the mother liquor fed to the potassium chloride dissolver. Thus, the cycle can be continued indefinitely, in each cycle adding 4,685 grams of potassium chloride and 9,433 grams of water, removing 6,854 grams of solid of which 6,350 grams is potassium nitrate, adding 5,530 grams of ammonium nitrate, removing 9,433 grams of water, and separating 3,361 grams of ammonium chloride.

EXAMPLE II

This example is based on Example I except that the process was carried out as a continuous steady-state operation. Thus, quantities are in parts by weight per hour passing through the equipment.

Solid potassium chloride and make-up water are added and mixed at 60° C. in the potassium chloride dissolver with mother liquor from the ammonium chloride centrifuge. From the potassium chloride dissolver, the solution is pumped through a solution cooler (not shown on FIG. 1) where it is cooled to about 45° C., then to the cooler-crystallizer where the solution is cooled further and the potassium nitrate crystals are grown at about 40° C. The resulting slurry is pumped to the potassium nitrate centrifuge where the potassium nitrate product is removed and washed. The solid product is dried and sent to storage.

and in which the NH$_4$NO$_3$ was added to the KNO$_3$ mother liquor and water evaporated with crystallization of NH$_4$Cl at 53° C., careful measurements were made on purity of the two products KNO$_3$ and NH$_4$Cl as follows:

|  | Composition of— | | | Approximate composition of mother liquor-free KNO$_3$ |
|---|---|---|---|---|
|  | Feed to KNO$_3$ crystallizer | Unwashed KNO$_3$ cake | KNO$_3$ mother liquor | |
| Eq. percent NH$_4$+ | 57.2 | 28.7 | 67.3 | 1 |
| Eq. percent K+ | 42.8 | 71.3 | 32.7 | 99 |
| Eq. percent Cl− | 48.0 | 23.6 | 56.0 | 0 |
| Eq. percent NO$_3$− | 52.0 | 76.4 | 44.0 | 100 |
| H$_2$O, mols/100 mols salt | 369 | | | |

|  | Composition of— | | | Approximate composition of mother liquor-free NH$_4$Cl |
|---|---|---|---|---|
|  | Feed to NH$_4$Cl crystallizer | Unwashed NH$_4$Cl cake | NH$_4$Cl mother liquor | |
| Eq. percent NH$_4$+ | 70.4 | 94.3 | 65.7 | 100 |
| Eq. percent K+ | 29.6 | 5.7 | 34.3 | 0 |
| Eq. percent Cl− | 48.2 | 90.7 | 40.3 | 99.5 |
| Eq. percent NO$_3$− | 51.8 | 9.3 | 59.7 | 0.5 |
| H$_2$O, mols/100 mols salt | 199 | | | |

Separated mother liquor from the potassium nitrate centrifuge is pumped through a solution heater (not shown in FIG. 1) where it is heated to about 60° C., then to the ammonium nitrate dissolver, wherein added ammonium nitrate is dissolved. The resulting solution is continuously drawn into the evaporator-crystallizer where water is evaporated at about 150 mm. Hg and crystals are grown at 60° C.

From the evaporator-crystallizer, the slurry is pumped to the ammonium fluoride centrifuge which removes and washes the ammonium chloride coproduct. The solid ammonium chloride is dried and sent to storage and the mother liquor advances to the potassium chloride dissolver, i.e., the mother liquor is returned to the start of the process.

Feed to the potassium chloride dissolver is 14,867 parts of mother liquor from the ammonium chloride centrifuge, 1,171 parts potassium chloride and 2,358 parts water. About 1,713 parts solid (dry basis) are removed as product from the potassium nitrate centrifuge, of which 1,587 parts is potassium nitrate (93 weight percent purity). About 1,382 parts ammonium nitrate is added to the ammonium nitrate dissolver and 2,358 parts of H$_2$O is removed from the evaporator-crystallizer. About 840 parts ammonium chloride coproduct (dry basis) is taken off the ammonium chloride centrifuge.

EXAMPLE III

This is the same type operation as in Example II, in steady state continuous operation, except that the cooler-crystallizer and potassium nitrate centrifuge acts at 0° C. instead of 40° C.

About 3,568 parts by weight of mother liquor per hour from the NH$_4$Cl centrifuge (36 equivalents (or mols) of K+ per 100 equivalents (or mols) of K+ and NH$_4$+, 38 equivalents (or mols) of Cl− per 100 equivalents (or mols) of Cl− and NO$_3$− and 200 mols H$_2$O per 100 mols of salts) is fed to the KCl dissolver together with 937 parts per hour of KCl and 2,661 parts by weight per hour of water. About 1,330 parts by weight per hour of KNO$_3$ (dry basis) is separated as the main product. About 1,065 parts by weight per hour solid NH$_4$NO$_3$ are added to the NH$_4$NO$_3$ mixer and 2,661 parts by weight per hour of H$_2$O are evaporated in the evaporator. About 672 parts by weight per hour NH$_4$Cl coproduct (dry basis) is separated in the centrifuge. Purity of KNO$_3$ product was 96 weight percent.

EXAMPLE IV

In an experiment similar to Example 1, with addition of KCl and H$_2$O to the mother liquor from NH$_4$Cl crystallization in which the KNO$_3$ was separated at 25° C.

These data show quite clearly that the NH$_4$Cl is very pure after removal of all mother liquor and the KNO$_3$ has only a very minor contamination with NH$_4$NO$_3$.

EXAMPLE V

This example is a variation of Example II to get a purer KNO$_3$ product. The example involves further treatment of the KNO$_3$ (93% purity) from the potassium nitrate centrifuge of Example II and requires additional equipment, namely a slurry mixer and a second potassium nitrate centrifuge.

With reference to Example II, the impure potassium nitrate from the potassium nitrate centrifuge, about 1,713 parts per hour, was sent to a slurry mixer operated at 25° C. where it is mixed with 1,000 parts of water and 117 parts of KCl. The resulting slurry was centrifuged to separate solid potassium nitrate which was washed with 180 parts of water. About 1,587 parts (dry basis) of pure potassium nitrate was recovered. The filtrate and washings may be added to the potassium chloride dissolver of Example II to replace about 10% of the added KCl and about half of the added water. In addition, NH$_4$O$_3$ added to the NH$_4$NO$_3$ dissolver should be reduced to 1,256 parts per hour, since it is no longer being removed from the system as an impurity in the KNO$_3$.

EXAMPLE VI

This example shows that a cyclic process can be operated in the reverse direction from that shown in the previous examples; i.e., the potassium nitrate is crystallized following ammonium nitrate addition rather than following potassium chloride addition. However, results are not as favorable as in the previous examples in that much less product is obtained per unit of material that must be recycled, and the product potassium nitrate has a higher impurity level.

The same starting solution at 60° C. is used as in Example I, i.e., 10,650 parts by weight of NH$_4$Cl, 10,900 parts by weight of NH$_4$NO$_3$, 19,050 parts by weight of KNO$_3$, and 18,867 parts by weight of water (36 equivalents of K+ per 100 equivalents of K+ and NH$_4$+, 38 equivalents of Cl− per 100 equivalents Cl− and NO$_3$−). To this solution with adequate mixing are added 1,890 parts by weight (210 parts more than theoretical) of solid NH$_4$NO$_3$ and 3,280 parts by weight of water; the solution is cooled to 40° C. and the solid separated on a centrifuge. This solid, 2,331 parts by weight (dry basis), contains 2,121 parts KNO$_3$ and 210 parts NH$_4$NO$_3$. It is the desired KNO$_3$ product and is 91% pure (dry weight basis). To the mother liquor is added 1,564 parts by weight KCl and the mixture heated to remove the 3,280 parts of water previously added and crystallized at 60°

C.; the solid is separated and washed on a centrifuge. This solid, 1,123 parts by weight (dry basis), is the nearly pure $NH_4Cl$ coproduct. The mother liquor is identical to that first used and the cycle can be continued endlessly.

I claim:

1. A cyclic process for preparing crystalline potassium nitrate and crystalline ammonium chloride comprising the steps of:
   (a) adding potassium chloride and water to a first aqueous nitrate-chloride mother liquor having a $K^+/(K^++NH_4^+)$ mol ratio of not more than about 0.37, the potassium chloride and water being added to the first aqueous nitrate-chloride mother liquor in amount sufficient to convert the mother liquor into a potassium nitrate crystallizing medium;
   (b) cooling the potassium nitrate crystallizing medium sufficiently to crystallize potassium nitrate equivalent to the potassium chloride added in step (a) and provide a second aqueous nitrate-chloride mother liquor having approximately the same $K^+/(K^++NH_4^+)$ mol ratio as the first nitrate-chloride mother liquor and a higher $Cl^-/(NO_3^-+Cl^-)$ mol ratio than the first nitrate-chloride mother liquor;
   (c) separating crystalline potassium nitrate from the second aqueous nitrate-chloride mother liquor;
   (d) adding ammonium nitrate to the second aqueous nitrate-chloride mother liquor in amount equivalent to the amount of potassium nitrate separated in step (c);
   (e) evaporating water from the mixture of ammonium nitrate and second aqueous nitrate-chloride mother liquor to produce an ammonium chloride crystallizing medium, the amount of water evaporated being equal to the amount of water added in step (a);
   (f) crystallizing ammonium chloride from the ammonium chloride crystallizing medium at a temperature substantially higher than the crystallization temperature of potassium nitrate in steb (b), to provide a mother liquor substantially the same as the first aqueous nitrate-chloride mother liquor fed to step (a);
   (g) separating crystalline ammonium chloride from the mother liquor; and then
   (h) repeating the steps (a)–(g) on the mother liquor recovered in step (g).

2. The process according to claim 1 wherein the first aqueous nitrate-chloride mother liquor of step (a) has a $K^+/(K^++NH_4^+)$ mol ratio within the range 0.20–0.37.

3. The process according to claim 2 wherein the second aqueous nitrate-chloride mother liquor of step (b) has a $K^+/(K^++NH_4^+)$ mol ratio within the range 0.20–0.37 and a $Cl^-/(NO_3^-+Cl^-)$ mol ratio within the range 0.40–0.80.

4. The process according to claim 3 wherein the temperature at which the crystalline potassium nitrate is crystallized from the potassium nitrate crystallizing medium in step (b) is within the range 0–60° C.

5. The process according to claim 4 wherein the temperature at which the crystalline ammonium chloride is crystallized from the ammonium chloride crystallizing medium in step (f) is at least about 20° C. higher than the crystallization temperature of the potassium nitrate in step (b).

6. The process according to claim 5 wherein the $Cl^-/NO_3^-$ mol ratio of the potassium nitrate crystallizing medium formed in step (a) is substantially equal to the $Cl^-/NO_3^-$ mol ratio of the ammonium chloride crystallizing medium of step (e).

7. The process according to claim 6 wherein the temperature at which the crystalline potassium nitrate is crystallized from the potassium nitrate crystallizing medium in step (b) is about 0° C. and the temperature at which the crystalline ammonium chloride is crystallized from the ammonium chloride crystallizing medium in step (f) is about 60° C.

8. The process according to claim 6 wherein the temperature at which the crystalline potassium nitrate is crystallized from the potassium nitrate crystallizing medium in step (b) is about 40° C. and the temperature at which the crystalline ammonium chloride is crystallized from the ammonium chloride crystallizing medium in step (f) is about 60° C.

9. The process according to claim 6 wherein the water evaporated in step (e) is evaporated at the same temperature at which the ammonium chloride is crystallized in step (f).

10. The process according to claim 6 wherein the crystalline potassium nitrate separated in step (c) is treated with aqueous potassium chloride and washed with water to produce a purer potassium nitrate product.

References Cited

UNITED STATES PATENTS

| | | | |
|---|---|---|---|
| 1,878,733 | 9/1932 | Thorssell | 23—102 |
| 2,157,260 | 5/1939 | Dessevre et al. | 23—102 |

FOREIGN PATENTS

| | | | |
|---|---|---|---|
| 502,158 | 1939 | Great Britain | 23—102 |

OTHER REFERENCES

U.S. Dept. of Agriculture, Miscellaneous Publication No. 192, July 1934, pp. 18–19, by C. W. Whittaker and F. O. Lundstrom, Washington, D.C.

EDWARD STERN, Primary Examiner

U.S. Cl. X.R.

23—102, 302; 71—59

UNITED STATES PATENT OFFICE

PO-1050
(5/69)

CERTIFICATE OF CORRECTION

Patent No. 3,595,609    Dated July 27, 1971

Inventor(s)    LELAND J. BECKHAM

It is certified that error appears in the above-identified patent and that said Letters Patent are hereby corrected as shown below:

Column 3, line 2 - "$NA_4NO_3$" should be

--$NH_4NO_3$--

Column 6, line 28 - "$(C^- + NO_3^-)$" should be

--$(Cl^- + NO_3^-)$--

Column 8, line 46 - "$NH_4O_3$" should be

--$NH_4NO_3$--

Signed and sealed this 28th day of December 1971.

(SEAL)
Attest:

EDWARD M. FLETCHER, JR.        ROBERT GOTTSCHALK
Attesting Officer              Acting Commissioner of Patents